June 30, 1936.   F. G. FUNK   2,045,767
EGG PACKAGING MACHINE
Filed July 23, 1934   4 Sheets-Sheet 1
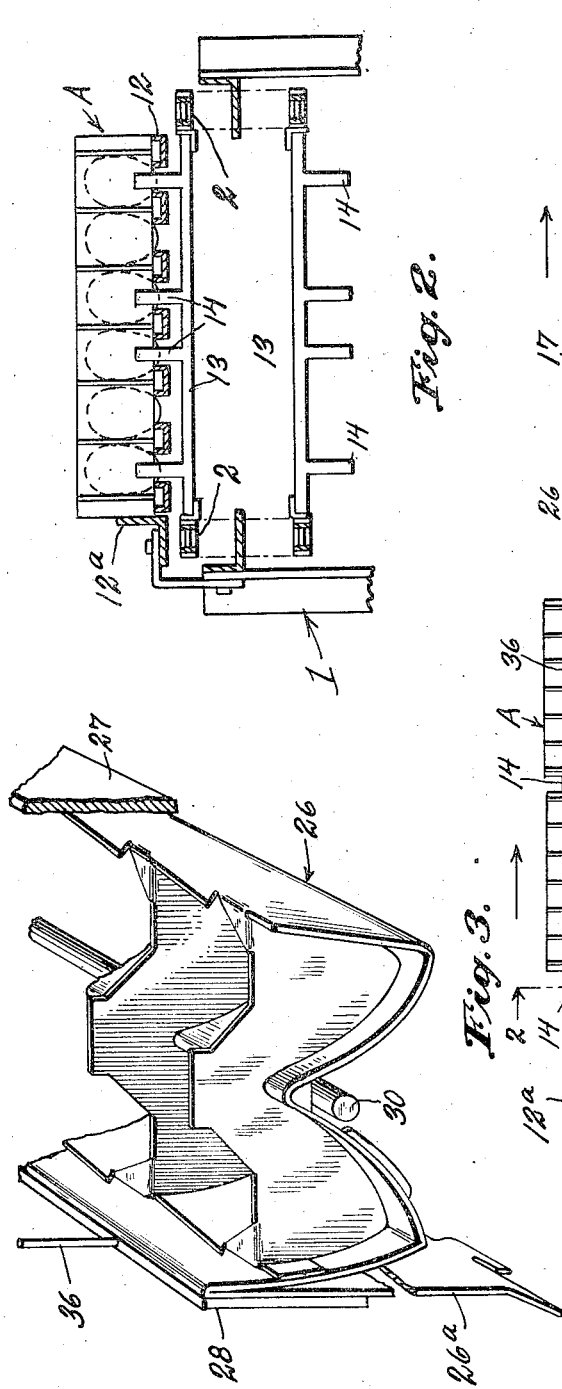
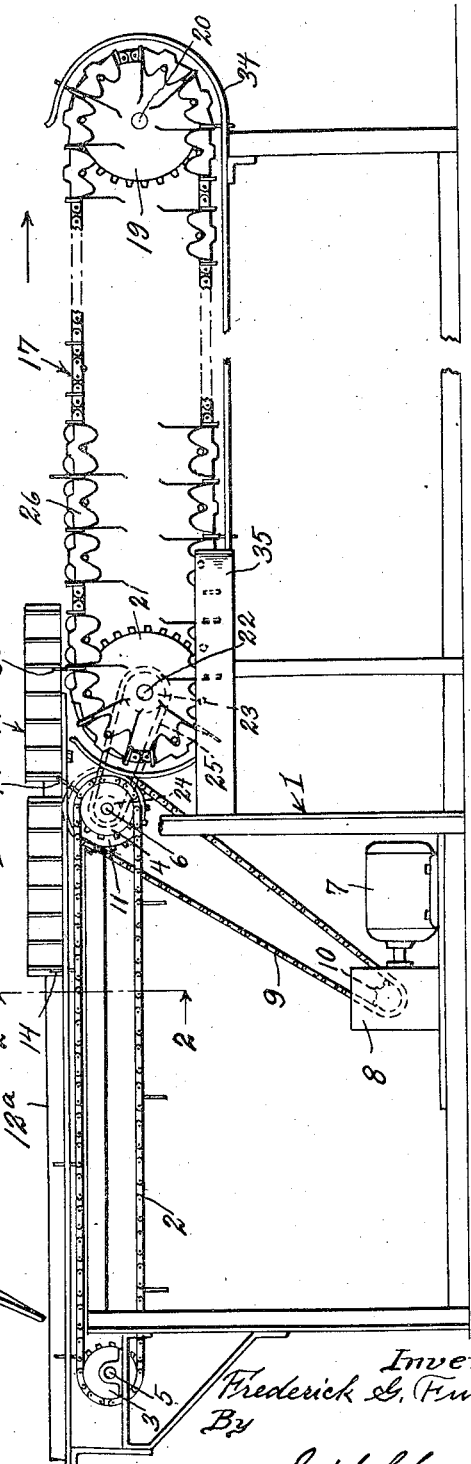
Inventor:
Frederick G. Funk
By Jones, Addington, Ames & Seibold.
Attorneys.

June 30, 1936. F. G. FUNK 2,045,767
EGG PACKAGING MACHINE
Filed July 23, 1934 4 Sheets-Sheet 3

Inventor:
Frederick G. Funk
By
Jones, Addington, Ames & Seibold
Attorneys.

June 30, 1936.  F. G. FUNK  2,045,767
EGG PACKAGING MACHINE
Filed July 23, 1934   4 Sheets-Sheet 4

Inventor.
Frederick G. Funk
By
Jones, Addington, Ames & Seibold.
Attorneys.

Patented June 30, 1936

2,045,767

UNITED STATES PATENT OFFICE 2,045,767

EGG PACKAGING MACHINE

Frederick G. Funk, Chicago, Ill.

Application July 23, 1934, Serial No. 736,482

8 Claims. (Cl. 226—14)

This invention relates to machines for packaging eggs and more particularly to means and method for automatically filling cartons such as are commonly used for retailing eggs.

The ordinary commercial carton is formed of paper or suitable fabric and is usually arranged to hold one dozen eggs in two rows of six eggs each, the eggs being supported in suitable individual pockets. The present invention provides means for automatically filling these cartons directly from the usual egg crate fillers by placing the fillers having eggs supported therein in close juxtaposition with suitably positioned cartons and releasing the eggs from the filler whereby they will drop by gravity into the carton pockets and in the same relative position in which they were supported in the filler.

It is an object of the present invention to provide suitable means for consecutively moving filled egg crate fillers and consecutive cartons in closely adjacent synchronized relation whereby the eggs will automatically move from the filler to completely fill consecutive cartons.

Another object is the provision of suitable carton supporting means preferably in the form of a conveyor whereby consecutive empty cartons may be easily fed to the machine in adjacent aligned position, and the filled cartons easily removed therefrom.

This application is a continuation in part of my pending application, Serial No. 731,815, filed June 22, 1934. In said pending application the method of removing filled egg crate fillers from an egg crate by means of a seven-tined fork is illustrated and described, and the same method may be used in supplying filled fillers to the embodiment disclosed herein; that is, the fork may be inserted underneath a filler in such manner that the eggs will be supported on the tines of the fork. The entire filler and eggs therein may then be removed from the crate and delivered to the machine by which the cartons are automatically filled.

It is also an object to provide an automatic carton filling device in combination with an egg handling machine of the type disclosed in the above noted copending application, wherein the eggs may be automatically delivered directly to empty egg cartons in a manner to completely fill the cartons with the eggs therein aligned in a desired axial relation.

Further objects will be apparent from the specification and the appended claims.

In the drawings:

Figure 1 is a side elevation of one embodiment of the invention, a portion being broken away for purposes of illustration.

Fig. 2 is a transverse section through the filler-feeding conveyor mechanism, and taken on a line corresponding substantially to line 2—2 of Figure 1.

Fig. 3 is a fragmentary perspective view of one of the empty egg cartons and its supporting means.

Figure 4:
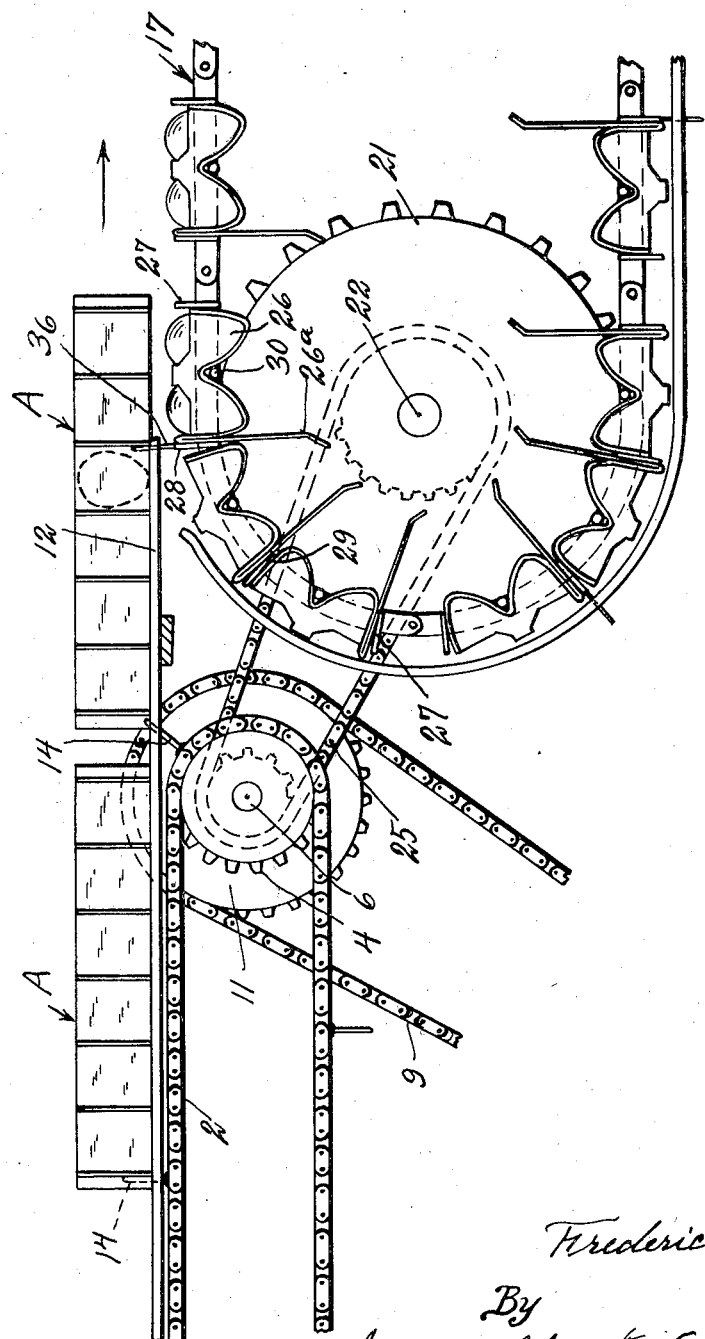
Fig. 4 is a somewhat diagrammatic view of the synchronizing packaging mechanism.

Referring to the drawings in detail, the embodiment illustrated comprises a frame 1. An endless filler conveyor comprising spaced chains 2 is supported on suitably spaced sprockets 3 and 4 on the frame. The sprockets 3 are secured to an idler shaft 5 and the sprockets 4 are similarly secured to a main drive shaft 6, the drive shaft being driven from a motor 7 through a suitable speed reducing mechanism 8 and a chain 9 on suitable sprockets 10 and 11.

Filler supports are mounted above the filler conveyor and comprise longitudinal rods 12, preferably U-shaped channels such as illustrated in cross section in Fig. 2. These channels are arranged to support the fillers A and eggs therein as illustrated. During their movement by the conveyor, the fillers are aligned, and guided in their movement, by a longitudinal angle iron or bar 12a.

The conveyor chains 2 are provided with spaced transverse flights 13 secured thereto and having upwardly extending arms or pins 14 which extend upwardly between the channels 12 and are arranged to engage the filled egg fillers and move them on the supports 12 in the direction of the arrow in Fig. 1.

Figure 8:
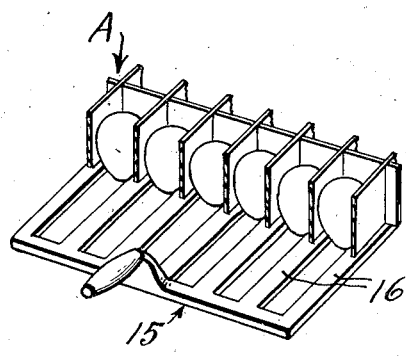
Fig. 8 is a fragmentary perspective view and illustrates the method of using a fork for removing the fillers and eggs therein from an egg crate and positioning them on the filler conveyor.

In supplying filled fillers to the conveyor, a filler A may be removed from an egg crate by means of a seven-tined fork 15 inserted thereunder as illustrated in Fig. 8. By this means the eggs are supported between the tines 16 of the fork and the filler is supported thereon. The fork and filler thereon are then placed transversely on the filling conveyor between the flights 13, and the arms 14 will engage consecutive fillers and move them in the direction of the arrow as indicated. The flights 13 are so spaced on the conveyor that when consecutive fillers are placed thereon the pins 14 will move the fillers in such relation that the space therebetween will be the same as the width of a single filler egg pocket.

A carton conveyor 17 is mounted in substantial alignment with the filler conveyor and comprises spaced chains 18 supported on suitable sprockets 19 on an idler shaft 20, and corresponding sprockets 21 secured to a shaft 22. The carton conveyor 17 is driven from the main drive shaft 6 by means of sprockets 23 and 24 and a suitable chain 25. Empty egg cartons 26 may be positioned on the carton conveyor, and preferably arranged in transverse parallel alignment and in sets of three as illustrated in Figs. 1 and 4, and the two conveyors and driving mechanism therefor are so synchronized that the movement of the fillers corresponds with the movement of the egg cartons in the direction of the arrow so that when the egg fillers are moved over the cartons, the pockets will be in alignment, that is, the filled filler and a set of three empty cartons will move into vertical alignment so that, as the eggs are released from the filler, they will drop into and completely fill the cartons in the same axial relation as in the filler.

Figure 5:
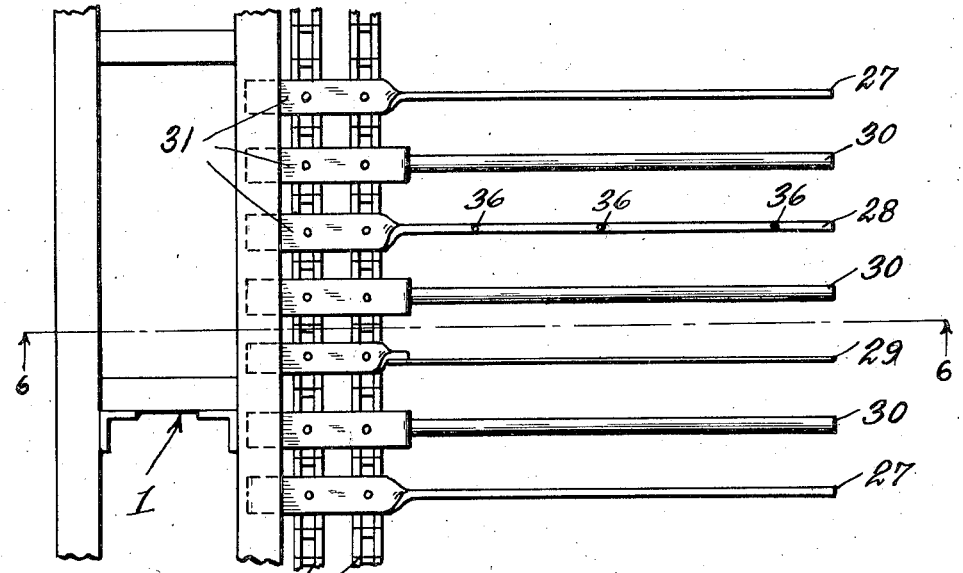
Fig. 5 is a top view of a portion of the carton supporting conveyor and the supporting frame therefor.
Figure 6:
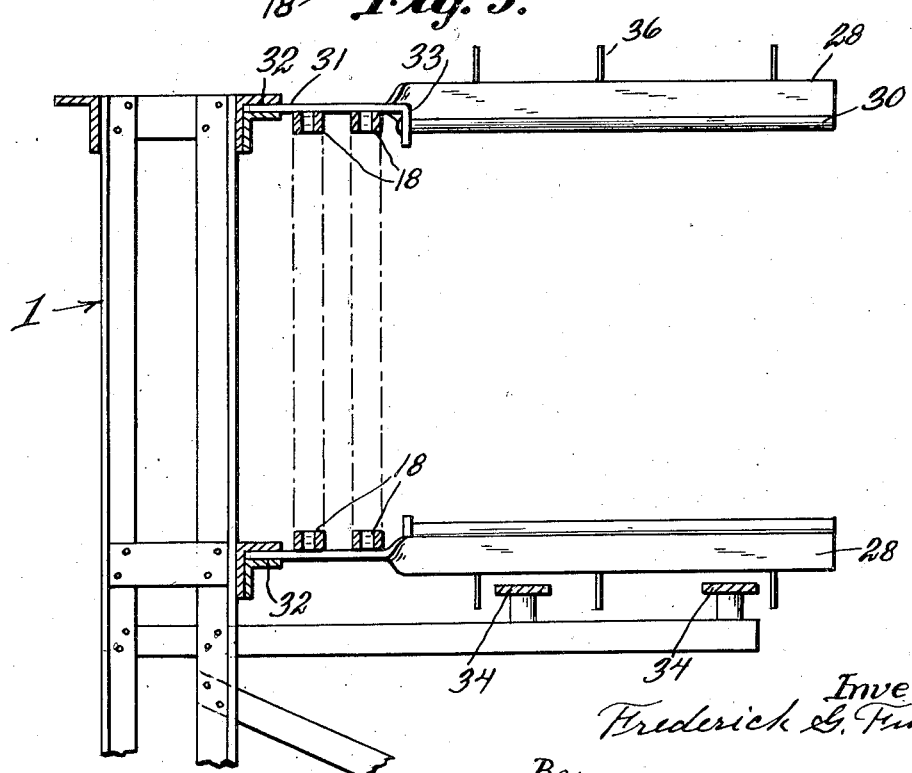
Fig. 6 is a transverse sectional elevation taken on a line substantially corresponding to line 6—6 of Fig. 5.

As previously stated, the carton conveyor 17 comprises the parallel chains 18 which may be supported on suitable guides, not shown. A plurality of spaced rods and bars are secured to these chains and extend outwardly therefrom, and are arranged to support cartons. These bars and rods are preferably arranged to support the cartons in spaced sets of three closely adjacent cartons, and, as shown in Fig. 5, the supports for each set comprise comparatively rigid flat bars 27 and 28 and a flexible bar 29. The bars are spaced as illustrated so that the cartons 26 may be inserted therebetween and supported on suitable rods 30 as illustrated in Fig. 3. All of the bars and rods are provided with rearwardly extending portions 31 and are secured to the conveyor chains 18 as shown. The rearwardly extending portions 31 are guided in a longitudinal slot 32 formed between the angle bars of the frame 1. By this means all of the bars and rods are supported in horizontal alignment during their movement.

The rods 30 are so arranged as to provide a shoulder 33 against which the cartons are positioned as they are placed on the rods and between the bars. These shoulders are for the purpose of aligning the cartons on the conveyor.

In placing the cartons on the conveyor, the cover 26a is bent downwardly as indicated in Fig. 3 and the carton is placed between the bars and resting on the rod 30. The carton illustrated is of the type ordinarily used. However, some cartons are arranged with half covers hinged on each side instead of a single cover. In using such cartons both covers are turned downwardly when the carton is inserted between the bars. Also, in some cartons the contour of the bottom is slightly different than the type illustrated, and in such a case the bars 30 are formed accordingly and in a manner to properly support the carton. After the cartons are loaded on the conveyor, as shown particularly in Figs. 1 and 4, the movement of the conveyor around the sprockets 19 and 21 tends to distort or misplace the cartons slightly and for that reason the bar 29 is preferably of comparatively thin flexible steel, whereby considerable flexibility is permitted in alignment of the cartons as they pass around the conveyor sprockets.

It has been found that the provision of this flexible bar 29, together with the inherent lost motion between the various parts, is sufficient to prevent displacement of the cartons and to maintain their alignment as they move into loading position.

Guards 34 are provided adjacent the under side of the conveyor and partially around the ends thereof in order to prevent the cartons from falling from the conveyor, and an aligning bar 35 is secured to the frame as shown in Fig. 1 and arranged to re-align any of the cartons which may have been misplaced laterally during their movement around the conveyor.

The sets of rods and bars are so positioned on the conveyor as to space each set of cartons a distance equal to the width of one filler pocket. By this arrangement each set of cartons will pass under a filler with all of the pockets in vertical alignment with the filler pockets.

Each of the bars 28 is provided with upwardly extending pins 36, and these pins are arranged to engage the fillers A and move them after the pins or arms 14 on the filler conveyor become ineffective for moving the filler. This arrangement is particularly illustrated in Fig. 4 in which it will be noted that the channels 12, on which the fillers are supported, extend over the carton conveyor and each transverse row of eggs in the filler will drop into a corresponding row of pockets in the container as the fillers and containers move to the right and the eggs reach the end of the bars 12.

Figure 7:
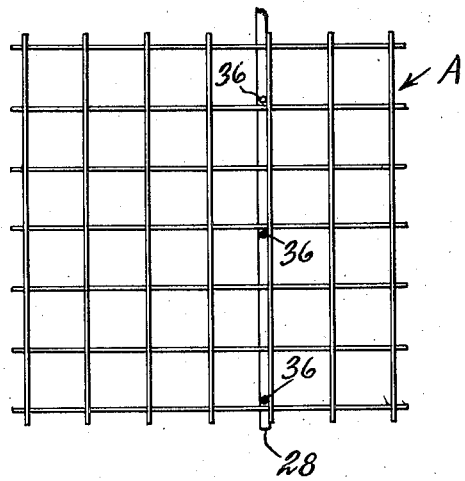
Fig. 7 is a top view of one of the egg fillers and illustrates the position of the filler engaging and moving pins on the carton conveyor.

The pins or arms 14 of the filler conveyor move each filler A over the carton conveyor until the second row of eggs in the filler is substantially in alignment with the second row of the first carton. The movement of the conveyors is so synchronized that immediately before, or substantially at the time that the filler arrives at this position, the pins 36 on the bars 28 of the carton conveyor will engage the third partition of the filler as shown in Figs. 4 and 7. The pins 36 are so positioned relative to the filler, that they engage in the corners of the pockets, as clearly shown in Fig. 7, whereby the eggs in the third row are not engaged by the pins during their movement. After the filler has been moved to the position indicated in Fig. 4, the pins 14 become ineffective and the pins 36 continue the movement of the filler until all of the eggs in the filler have been deposited in an aligned set of cartons.

In the normal operation of the device, the fillers are placed on the filler conveyor by means of a fork similar to the fork 15, and empty cartons are placed in consecutive order on the carton conveyor. As the fillers and cartons move adjacent each other in superimposed relation, the eggs drop row by row from the ends of the supporting channels 12 into corresponding rows of pockets in the cartons, and the loaded cartons are then immediately removed and replaced by empty ones.

Figure 9:
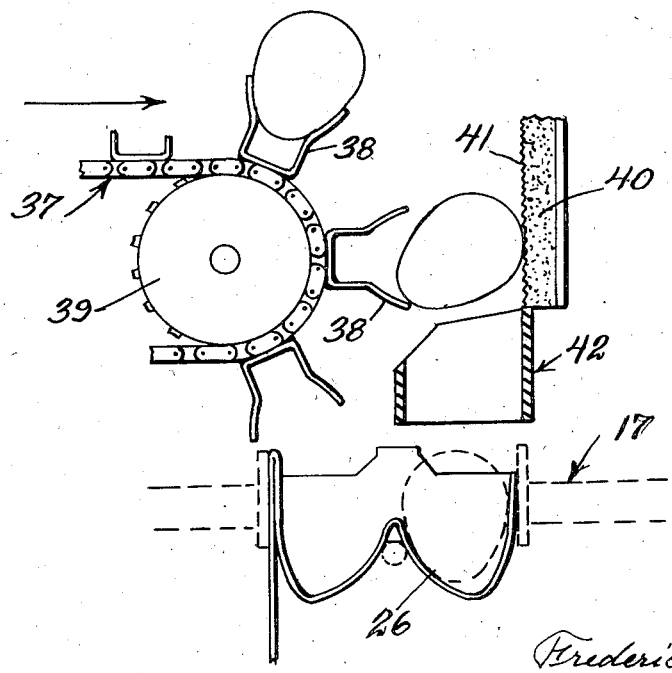
Fig. 9 is a diagrammatic view illustrating a method of filling egg cartons in which the filler conveyor is entirely dispensed with and the cartons are arranged to be filled directly from the egg conveyor of an egg handling machine.

Fig. 9 illustrates a method of loading the empty cartons directly from the discharge conveyor of a processing or egg handling machine similar to that in the above noted copending application, Serial No. 731,815. In this arrangement the filler conveyor is entirely dispensed with, and the carton conveyor 17 is preferably driven directly from the operating mechanism of the egg handling machine and its movement is synchronized therewith.

The egg handling machine comprises a discharge conveyor 37 constantly driven in the direction of the arrow. This conveyor is provided with egg holders 38, and each holder comprises elongated transverse spaced seats whereby a row of eggs may be removably supported therein. The carton conveyor 17 is placed under and closely adjacent the conveyor 37 and is of the same construction and operates in the same manner as previously described. The conveyor 37 is supported on suitable sprockets 39 and as the conveyor travels around these sprockets, the egg pockets will be tilted in a manner to discharge the eggs as illustrated. A barrier 40 is positioned in the path of the eggs as they are discharged from the pockets and is preferably formed of sponge rubber or other suitable material having a friction surface 41 which may be slightly corrugated if desired.

As the eggs tilt in falling from the pockets 38, the large ends of the eggs will rest against the friction surface 41 and will therefore be retained during further movement of the egg conveyor, and the eggs will take a position somewhat similar to that illustrated in Fig. 9. A slight further movement of the conveyor causes the eggs to be released and due to the frictional surface 41 they will then fall point downward into the carton 26. A guide 42 of suitable material may be provided for the eggs if desired. The movement of the conveyors 37 and 17 is so synchronized that consecutive rows of carton egg pockets are aligned below the guide 42 at the time a row of eggs is discharged from the egg conveyor.

In packing eggs in cartons it is desirable that they should be packed with the pointed ends down and this is accomplished in the present invention.

It is usually found desirable to use the carton conveyor 17 in connection with automatic loading mechanisms similar to those previously described. However, in certain cases it has been found desirable to load the eggs directly from the filler into the egg cartons without using the filler conveyor. This may be accomplished by supporting a filler on the fork 15 and then placing the fork and filler directly over a set of cartons on the conveyor 17 in such a manner that the pockets of the cartons and the filler are in vertical alignment, then retaining the filler in this alignment while withdrawing the fork and releasing the eggs which will drop by gravity into the pockets of the cartons as the fork tines are withdrawn. While this method is satisfactory, it is generally found desirable to use the completely automatic equipment herein described.

Modifications may be made in the embodiment herein illustrated and described and it is therefore desired that the invention be limited only by the prior art and the scope of the appended claims.

Having thus described the invention what is desired to be secured by Letters Patent is:

1. The method of packaging eggs in moving cartons comprising continuously aligning empty cartons on a continuously moving support so that the egg pockets therein correspond in arrangement to the pockets of egg-crate fillers, continuously moving filled fillers from a support into superimposed synchronized relation over said moving cartons and in such relation that consecutive rows of eggs from said fillers will drop consecutively from said support into corresponding rows of pockets in said cartons.

2. An egg packaging machine comprising means for continuously moving egg cartons, means for continuously moving filled egg-crate fillers in superjacent relation with said cartons, and fixed means for supporting the eggs in the moving fillers and arranged to release the eggs therefrom and into said cartons during movement of the filler beyond the limit of said support.

3. In an automatic carton filling machine, a support for filled egg-crate fillers, means for continuously moving consecutive fillers beyond the limit of said support, and means for continuously moving consecutive empty cartons below said support and with their pockets in alignment with the pockets in said fillers, said support being arranged to permit the eggs in said filler to drop row by row into corresponding rows of pockets in said cartons as each consecutive filler row passes beyond the limit of said support.

4. An egg-carton filling machine of the character described comprising a conveyor for continuously moving filled egg-crate fillers, means for supporting the eggs in said fillers, said filler conveyor being arranged to move consecutive fillers to a position overhanging said support whereby eggs will be released from said filler, and means for continuously moving consecutive cartons under said fillers to receive the eggs as they are released.

5. A synchronized carton and filler moving mechanism comprising a filler conveyor, a carton conveyor, means on said filler conveyor for synchronously moving fillers into juxtaposition with cartons on said carton conveyor, and means on said carton conveyor to continue the synchronized movement of said fillers with said cartons.

6. A carton filling machine comprising a filler conveyor and a carton conveyor substantially in alignment and arranged to be moved in the same direction and at the same relative speed, a longitudinal filler support adjacent said filler conveyor and extending over said carton conveyor, means on said filler conveyor for consecutively moving filled fillers on said support and over empty cartons on said carton conveyor whereby some of the eggs in each consecutive filler are released from said support and move into said cartons, and means synchronized with the movement of the filler by said filler conveyor to continue the movement of each consecutive filler beyond said support to deposit all of the remaining eggs from said filler into said cartons.

7. In an egg-carton filling machine, a carton conveyor having spaced flights thereon arranged to support consecutive cartons therebetween with their egg pockets arranged to correspond with the egg pockets of an egg-crate filler, a filler support adjacent said conveyor, and means for moving a filler from said support with the pockets of said filler in axial alignment with corresponding pockets in said cartons.

8. In a carton filling machine, a support for filled egg-crate fillers, means for moving said fillers beyond the limit of said support to permit the eggs to drop therefrom, a conveyor synchronized with the movement of said fillers and arranged to position cartons to receive the eggs dropped from said fillers, said conveyor comprising a movable member having laterally extending supporting members forming open end skeleton pockets whereby the filled cartons may be removed laterally therefrom.

FREDERICK G. FUNK.